US010477637B2

(12) United States Patent
Lin

(10) Patent No.: US 10,477,637 B2
(45) Date of Patent: Nov. 12, 2019

(54) DIRECT-LIGHTING MODE AND SOFT-LIGHTING MODE INTERCHANGEABLE PHOTOGRAPHY LED ILLUMINATING LAMP

(71) Applicant: Biguang Lin, Shantou (CN)

(72) Inventor: Biguang Lin, Shantou (CN)

(73) Assignee: Biguang Lin, Shantou (CN)

( * ) Notice: Subject to any disclaimer, the term of this patent is extended or adjusted under 35 U.S.C. 154(b) by 144 days.

(21) Appl. No.: 15/362,856

(22) Filed: Nov. 29, 2016

(65) Prior Publication Data

US 2017/0202067 A1    Jul. 13, 2017

(30) Foreign Application Priority Data

Jan. 7, 2016   (CN) .......................... 2016 1 0007562

(51) Int. Cl.
*F21S 9/02* (2006.01)
*F21V 17/02* (2006.01)
(Continued)

(52) U.S. Cl.
CPC ............ *H05B 33/0845* (2013.01); *F21S 9/02* (2013.01); *F21V 3/06* (2018.02); *F21V 17/02* (2013.01);
(Continued)

(58) Field of Classification Search
CPC ............... G03B 15/05; G02F 1/133615; G02F 1/133603; G02B 6/0033; G02B 6/0035; G02B 6/0036
See application file for complete search history.

(56) References Cited

U.S. PATENT DOCUMENTS

D735,922 S  *  8/2015  Yamauchi ................... D16/239
2005/0265014 A1*  12/2005  Matsui ................... G03B 15/05
                                                   362/5
(Continued)

FOREIGN PATENT DOCUMENTS

AU     2016277686 B2    8/2017
CN       201363568 Y   12/2009
(Continued)

OTHER PUBLICATIONS

English translation of first office action issued in Japanese Patent Application No. 2017-506962 dated Feb. 6, 2018.
(Continued)

*Primary Examiner* — Alexander K Garlen
*Assistant Examiner* — Eric T Eide
(74) *Attorney, Agent, or Firm* — Leason Ellis LLP

(57) ABSTRACT

A direct-lighting mode and soft-lighting mode interchangeable photography LED illuminating lamp. The present invention solves an inconvenience that a camera photographer has to carry a direct-lighting LED illuminating lamp and a soft-lighting LED illuminating lamp both, and there is no such LED illuminating lamp currently. The essence of the technical solution includes: a lamp casing, a plurality of LED lights, a power supply connector, a power supply switch, a stand, and a luminescence window provided at the front face of the lamp casing, wherein the lamp casing is provided with a plurality of first LED lights at its front face thereof opposite to the inner side of the luminescence window, with the radiation directions of the first LED lights being toward the front of the LED illuminating lamp; the lamp casing is further provided with a plurality of second LED lights at its inner circumferential faces opposite to the inner side of the luminescence window; the lamp casing is provided with a transparent light guide plate for covering the (Continued)

luminescence window which is positioned opposite to the inner side of the luminescence window, with the radiation directions of the second LED lights being toward the outer circumferential faces of the transparent light guide plate respectively; the inward surface of the transparent light guide plate facing the first LED lights is provided with light ray reflection dents; and the lamp casing is further provided with an illumination mode toggle switch.

10 Claims, 3 Drawing Sheets

(51) Int. Cl.
| | | |
|---|---|---|
| F21V 19/00 | (2006.01) | |
| F21V 23/04 | (2006.01) | |
| F21V 23/06 | (2006.01) | |
| H05B 33/08 | (2006.01) | |
| G03B 15/02 | (2006.01) | |
| F21V 3/06 | (2018.01) | |
| F21V 8/00 | (2006.01) | |
| F21Y 115/10 | (2016.01) | |
| H04N 5/225 | (2006.01) | |

(52) U.S. Cl.
CPC ............ *F21V 19/003* (2013.01); *F21V 23/04* (2013.01); *F21V 23/06* (2013.01); *G02B 6/0011* (2013.01); *G03B 15/02* (2013.01); *H05B 33/0857* (2013.01); *F21Y 2115/10* (2016.08); *G03B 2215/0514* (2013.01); *G03B 2215/0567* (2013.01); *G03B 2215/0582* (2013.01); *H04N 5/2256* (2013.01)

(56) References Cited

U.S. PATENT DOCUMENTS

| | | | |
|---|---|---|---|
| 2011/0242839 A1* | 10/2011 | Dunn | G02B 6/0068 362/606 |
| 2012/0044374 A1 | 2/2012 | Pohlert et al. | |
| 2012/0243860 A1 | 9/2012 | Yang | |
| 2012/0257406 A1* | 10/2012 | Minami | G02B 27/2214 362/602 |
| 2013/0094242 A1* | 4/2013 | Yang | G02F 1/1336 362/602 |
| 2014/0340573 A1 | 11/2014 | Clawson | |
| 2015/0029380 A1* | 1/2015 | Noh | G03B 13/02 348/333.01 |
| 2015/0256655 A1 | 9/2015 | Jannard | |
| 2015/0330610 A1* | 11/2015 | Song | F21V 25/12 362/6 |
| 2016/0054510 A1* | 2/2016 | Okimoto | G02B 6/0055 349/64 |
| 2016/0091151 A1* | 3/2016 | Itoi | G02B 6/0068 362/612 |
| 2016/0161659 A1* | 6/2016 | Minami | G02B 6/0031 362/609 |

FOREIGN PATENT DOCUMENTS

| | | |
|---|---|---|
| CN | 202065747 U | 12/2011 |
| CN | 202372740 U | 8/2012 |
| CN | 203052421 U | 7/2013 |
| CN | 203350579 U | 12/2013 |
| CN | 203453941 U | 2/2014 |
| CN | 203642042 U | 6/2014 |
| CN | 204374572 U | 6/2015 |
| CN | 105446058 A | 3/2016 |
| CN | 205301778 U | 6/2016 |
| JP | 2007187914 A | 7/2007 |
| JP | 2012209862 A | 10/2012 |
| KR | 20120017319 A | 2/2012 |
| KR | 20120119867 A | 10/2012 |
| KR | 101227734 B1 | 1/2013 |
| KR | 101320444 B1 | 10/2013 |
| KR | 101351050 B1 | 1/2014 |
| WO | 2012103554 A2 | 8/2012 |

OTHER PUBLICATIONS

English translation of first office action issued in Korean Patent Application No. 10-2017-7002142 dated Mar. 23, 2018.
First office action issued in Canadian Patent Application No. 2955868 dated Dec. 11, 2017.
PCT International Search Report and Written Opinion dated Sep. 9, 2016 from corresponding Application No. PCT/CN2016/000201, 12 pages.
Examination Report dated Mar. 14, 2017 in corresponding Australian Patent Application No. 20162277686, 10 pages.
Office Action issued in Canadian Patent Application No. 2955868 dated Oct. 11, 2018.
First Office Action issued in German Patent Application No. 10 2016 1263 775.2 dated Aug. 9, 2018.
Notice of Final Rejection issued in Korean Patent Application No. 10-2017-7002142 dated Oct. 15, 2018.
Decision of Refusal issued in Chinese Patent Application No. 2017-506962 dated Oct. 2, 2018.

* cited by examiner

DIRECT-LIGHTING MODE AND SOFT-LIGHTING MODE INTERCHANGEABLE PHOTOGRAPHY LED ILLUMINATING LAMP

TECHNICAL FIELD

The present invention relates to an illuminating apparatus for photographing or video recording, and more particularly, to a direct-lighting mode and soft-lighting mode interchangeable photography LED illuminating lamp.

BACKGROUND

Conventionally used photography LED illuminating lamps may be divided into direct-lighting type and soft-lighting type. The direct-lighting photography LED illuminating lamp is exemplified by "A splicable photography LED illuminating lamp" in Chinese utility model No. 201120502007.5 of the prior application of the present applicant. In this utility model, a plurality of LED lights are provided on a circuit board arranged inside a luminescence window of a lamp casing in a manner of front direct-lighting. The light ray radiation distance of such an LED illuminating lamp may be relatively long but the light rays are relatively glaring. A soft-lighting plate may be added to the luminescence window of the lamp casing to reduce the glaring extent of the light rays. On the other hand, a soft-lighting photography LED illuminating lamp is exemplified by "An LED illuminating lamp for photographing or video recording" in Chinese utility model No. 201320017274.2 which is a prior application by the present applicant. In this utility model, a plastic light guide plate is provided at the inner side of a luminescence window of the lamp casing, which covers the luminescence window with its front face. And, a plurality of LED lights are arranged around the circumferential faces of the plastic light guide plate in a manner of directing lights to the circumferential faces of the plastic light guide plate. The light rays by such an LED illuminating lamp are soft and not glaring but the radiation distance is relatively short or shorter than the light ray radiation distance of the direct-lighting photography LED illuminating lamp.

The above two types of photography LED illuminating lamps have their own advantages and disadvantages, and usually a direct-lighting photography LED illuminating lamp needs to be used to achieve ideal illumination effects in a photography occasion with a relatively long radiation distance; and a soft-lighting photography LED illuminating lamp needs to be used to achieve ideal illumination effects in a photography occasion with a relatively short radiation distance. If a photographer goes out for photographing or camera photography, he or she has to carry a direct-lighting photography LED illuminating lamp and a soft-lighting photography LED illuminating lamp both, which is inconvenient. Currently, there is no photography LED illuminating lamp which is suitable for relatively long distance photography illumination and relatively short distance photography illumination.

SUMMARY

In order to overcome an inconvenience that a camera photographer has to carry a direct-lighting photography LED illuminating lamp and a soft-lighting photography LED illuminating lamp both when going out for photographing or video recording and there is no LED illuminating lamp which is not only suitable for relatively long-distance photography illumination but also suitable for relatively short-distance photography illumination currently, an object of the present invention is to provide an improved direct-lighting mode and soft-lighting mode interchangeable photography LED illuminating lamp so as to overcome the above drawback in the prior art.

A technical solution adopted by the present invention in order to solve the above technical problem is as follows. A direct-lighting mode and soft-lighting mode interchangeable photography LED illuminating lamp comprises a lamp casing, a plurality of LED lights installed inside the lamp casing, a power supply connector and a power supply switch provided on the lamp casing, a stand connected to the lamp casing, and a luminescence window provided at the front face of the lamp casing. The lamp casing is provided with a plurality of first LED lights at its front face opposite to the inner side of the luminescence window. The radiation directions of the first LED lights are toward the front of the LED illuminating lamp. The lamp casing is further provided with a plurality of second LED lights at its inner circumferential faces opposite to the inner side of the luminescence window. The lamp casing is provided with a transparent light guide plate for covering the luminescence window and the transparent light guide plate is positioned in front of the first LED lights and opposite to the inner side of the luminescence window. The radiation directions of the second LED lights are toward the outer circumferential faces of the transparent light guide plate respectively. The inward surface of the transparent light guide plate facing the first LED lights is evenly provided with light ray reflection dents. And, the lamp casing is further provided with an illumination mode toggle switch.

In the above technical solution, the power supply connector may be a dry battery holder or an externally provided power supply outlet.

In the above technical solution, the stand may be a hot-boot stand for connecting a photography device, a stand for connecting a floor stand or a stand for connecting a table stand.

In the above technical solution, the lamp casing may be provided with a circuit board therein and the first LED lights and the second LED lights are electrically connected to the power supply connector, the power supply switch, the illumination mode toggle switch, and the circuit board correspondingly.

In the above technical solution, the luminescence window may be provided on a detachable window frame on the lamp casing.

In the above technical solution, the lamp casing may be further provided with an illumination brightness regulator and an illumination color temperature regulator. The first LED lights and the second LED lights are electrically connected to the power supply connector, the power supply switch, the illumination mode toggle switch, the illumination brightness regulator and the illumination color temperature regulator and the circuit board correspondingly.

Beneficial effects of the present invention are as follows: because the lamp casing is provided with a plurality of first LED lights at its front face opposite to the inner side of the luminescence window, the radiation directions of the first LED lights are toward the front of the LED illuminating lamp. The lamp casing is provided with a transparent light guide plate covering the luminescence window and this guide plate is positioned in front of the first LED lights opposite to the inner side of the luminescence window. Thus, the LED illuminating lamp may perform direct lighting through the first LED lights and the transparent light guide plate and provide ideal illumination for long-distance photography. On the other hand, because the lamp casing is provided with a plurality of second LED lights at its inner circumferential faces opposite to the inner side of the luminescence window and the lamp casing is provided with a transparent light guide plate covering the luminescence window, positioned in front of the first LED lights, and opposite to the inner side of the luminescence window, the radiation directions of the second LED lights are toward the outer circumferential faces of the transparent light guide plate respectively. Further, the inward surface of the transparent light guide plate facing the first LED lights is provided with light ray reflection dents. Therefore, the LED illuminating lamp may perform soft-lighting illumination through the second LED lights and the transparent light guide plate and thus provide ideal illumination for short-distance photography. Yet, because the lamp casing is provided with an illumination mode toggle switch, the above two illumination mode may realize convenient and rapid interchange on the photographing site. The present invention can not only make the photographer carry few stuff when going out for photographing or video recording and make illumination mode interchanged rapidly and conveniently but also provide a new appliance for the illumination field of photographing or video recording, which supplements the blank of such appliances.

The present invention will be further described in conjunction with the accompanying drawings and embodiment.

Figure 1:
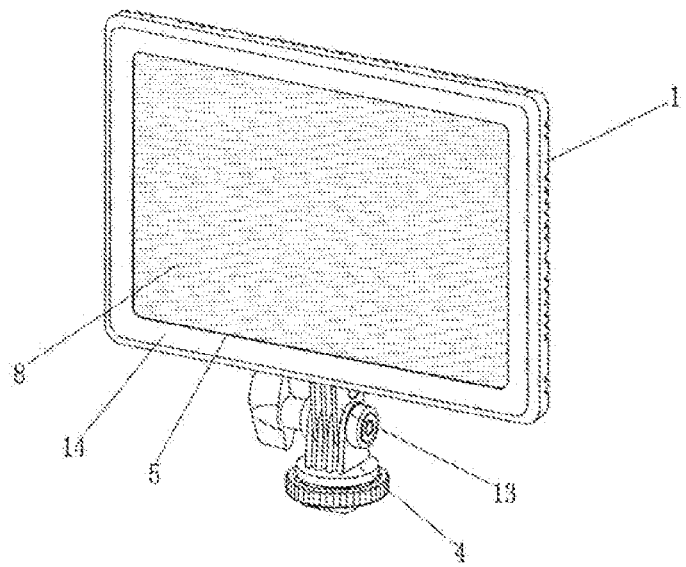
FIG. 1 is a perspective view of a LED illuminating lamp according to one embodiment of the present invention.
Figure 2:
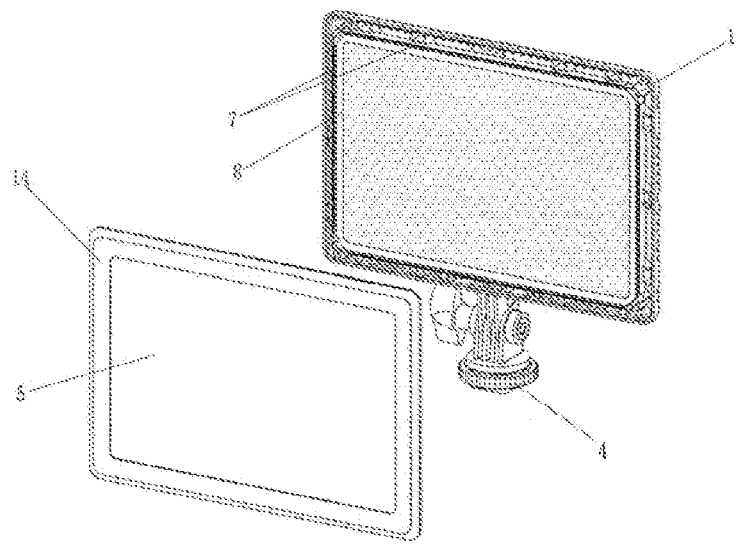
FIG. 2 is a perspective view showing the LED illuminating lamp of FIG. 1 with the window frame being detached.
Figure 3:
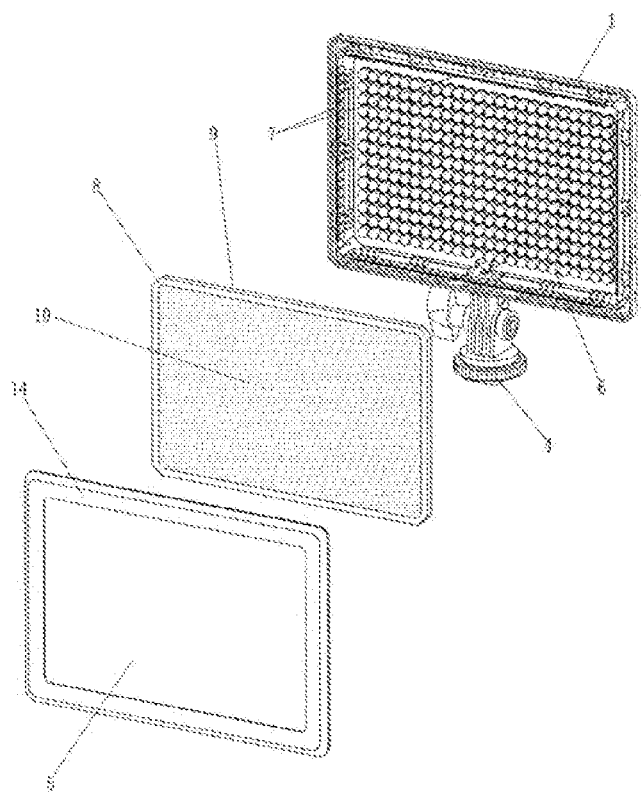
FIG. 3 is a perspective view showing the LED illuminating lamp of FIG. 2 with the transparent light guide plate being further detached.
Figure 4:
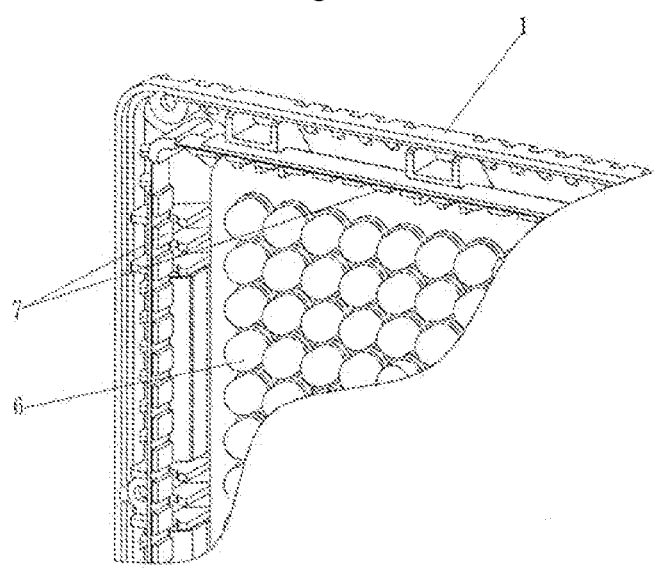
FIG. 4 is a perspective view showing a partially enlarged portion of FIG. 3.
Figure 5:
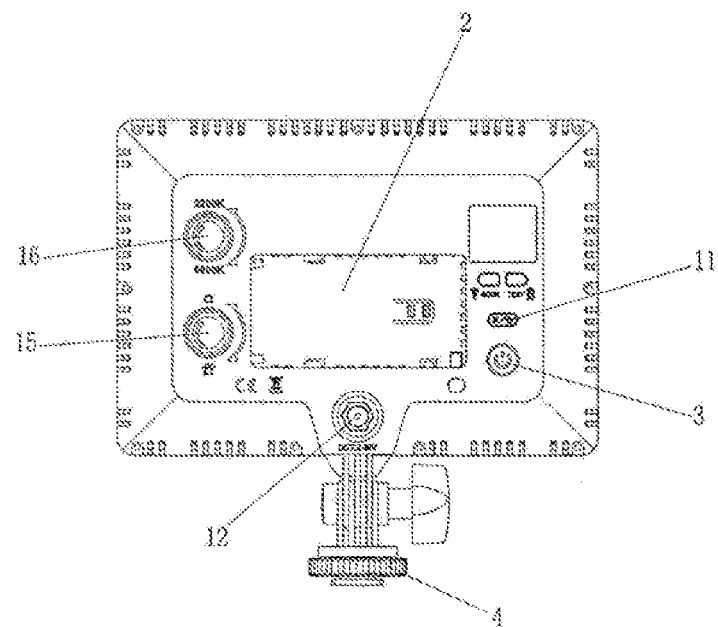
FIG. 5 is a backside view of FIG. 1.

In the above figures, same drawing label is directed to a same part or portion of the LED lamp in which:

1~lamp casing; 2~power supply connector; 3~power supply switch; 4~stand; 5~luminescence window; 6~first LED light; 7~second LED light; 8~transparent light guide plate; 9~outer circumferential face of the light guide plate; 10~light ray reflection dent; 11~illumination mode toggle switch; 12~externally provided power supply outlet; 13~LED illuminating lamp illumination angle adjustment joint; 14~window frame; 15~illumination brightness regulator; 16~illumination color temperature regulator; and 17~stand.

DETAILED DESCRIPTION

Referring to FIGS. 1 to 5, a direct-lighting mode and soft-lighting mode interchangeable photography LED illuminating lamp includes a lamp casing 1, a plurality of LED lights installed inside the lamp casing 1, a power supply connector 2 and a power supply switch 3 provided on the lamp casing 1, a stand 4 connected to the lamp casing 1, and a luminescence window 5 provided at the front face of the lamp casing 1. The lamp casing 1 is provided with a plurality of front-facing LED lights 6 (or first LED lights 6) at its front face opposite to the inner side of the luminescence window 5. The radiation directions of the first LED lights 6 are toward the front of the LED illuminating lamp. The lamp casing 1 is further provided with a plurality of side-facing LED lights 7 (or second LED lights 7) arranged at its inner circumferential faces opposite to the inner side of the luminescence window 5. The lamp casing 1 is yet further provided with a transparent light guide plate 8 for covering the luminescence window 5 and this transparent light guide plate 8 is positioned in front of the first LED lights 6 and opposite to the inner side of the luminescence window 5. The radiation directions of the second LED lights 7 are toward the outer circumferential faces 9 of the transparent light guide plate 8 respectively. The inward surface of the transparent light guide plate 8 facing the first LED lights 6 is evenly provided with light ray reflection dents 10. And, the lamp casing 1 is moreover provided with an illumination mode toggle switch 11.

In addition, the power supply connector 2 is a dry battery holder and the lamp casing 1 is further provided with an externally provided power supply outlet 12. The stand 4 is a hot-boot stand for connecting a photography device and provided with an LED illuminating lamp illumination angle adjustment joint 13. The lamp casing 1 is further provided with a circuit board (not shown) therein. The first LED lights 6 and the second LED lights 7 are electrically connected to the power supply connector 2, the power supply switch 3, the illumination mode toggle switch 11, and the circuit board correspondingly. The illumination window 5 is provided on a detachable window frame 14 on the lamp casing 1. The lamp casing 1 is further provided with an illumination brightness regulator 15 and an illumination color temperature regulator 16. The first LED lights 6 and the second LED lights 7 are electrically connected to the power supply connector 2, the power supply switch 3, the illumination mode toggle switch 11, the illumination brightness regulator 15, the illumination color temperature regulator 16 and the circuit board correspondingly.

Figure 6:
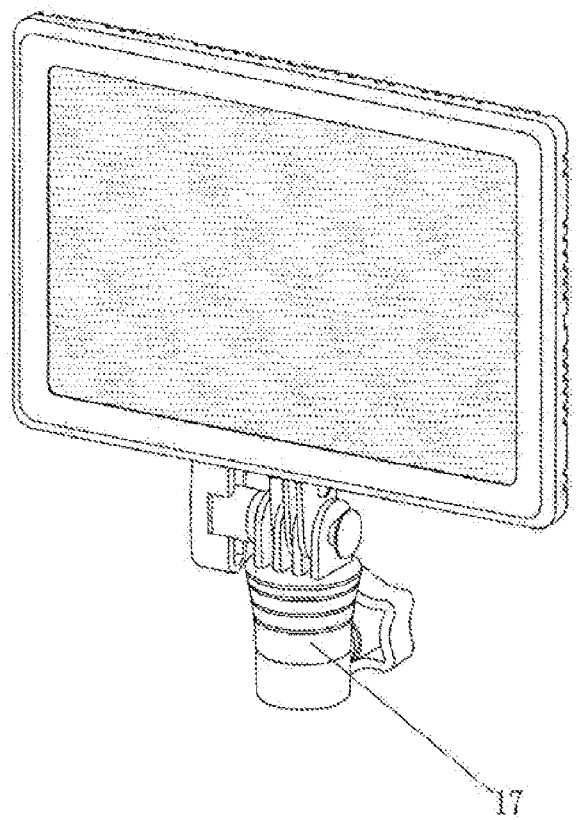
FIG. 6 is a perspective view showing a LED illuminating lamp according to another embodiment of the present invention.

FIG. 6 shows a LED illuminating lamp according to another embodiment of the present Invention. Comparing the LED shown by FIG. 6 with that shown by FIG. 1, the difference lies in that the stand 17 is a stand for connecting with a floor stand or a table stand. The other structures thereof are the same.

What is claimed is:

1. A direct-lighting mode and soft-lighting mode interchangeable photography LED illuminating lamp comprising:
   a lamp casing,
   a plurality of LED lights installed inside the lamp casing,
   a power supply connector and a power supply switch provided on the lamp casing,
   a stand connected to the lamp casing, and
   a luminescence window provided at the front face of the lamp casing and configured to transmit light generated by the plurality of LED lights without substantial alteration outside of the lamp casing, wherein:
      the lamp casing is provided with a plurality of first LED lights at its front face opposite to the inner side of the luminescence window, with the radiation directions of the first LED lights being toward the front of the LED illuminating lamp; the lamp casing is further provided with a plurality of second LED lights at its inner circumferential faces opposite to the inner side of the luminescence window;

the lamp casing is provided with a completely transparent light guide plate for covering the luminescence window and the transparent light guide plate is positioned in front of the first LED lights and opposite to the inner side of the luminescence window, with the radiation directions of the second LED lights being toward the outer circumferential faces of the transparent light guide plate respectively, wherein the first LED lights performs direct-lighting illumination through the transparent light guide plate positioned in front thereof;

the inward surface of the transparent light guide plate facing the first LED lights is evenly provided with light ray reflection dents, so that the second LED lights performs soft-lighting illumination through the transparent light guide plate; and the lamp casing is further provided with an illumination mode toggle switch for switching between direct-lighting mode and soft-lighting mode.

2. The direct-lighting mode and soft-lighting mode interchangeable photography LED illuminating lamp according to claim 1, wherein the power supply connector is a dry battery holder or an externally provided power supply outlet.

3. The direct-lighting mode and soft-lighting mode interchangeable photography LED illuminating lamp according to claim 1, wherein the stand is a-hot-shoe for connecting the photography LED illuminating lamp to a photography device, a stand for connecting the photography LED illuminating lamp to a floor stand or a stand for connecting the photography LED illuminating lamp to a desk stand.

4. The direct-lighting mode and soft-lighting mode interchangeable photography LED illuminating lamp according to claim 2, wherein the stand is a-hot-shoe for connecting the photography LED illuminating lamp to a photography device, a stand for connecting the photography LED illuminating lamp to a floor stand or a stand for connecting the photography LED illuminating lamp to a desk stand.

5. The direct-lighting mode and soft-lighting mode interchangeable photography LED illuminating lamp according to claim 1, wherein the lamp casing is provided with a circuit board therein and the first LED lights and the second LED lights are electrically connected to the power supply connector, the power supply switch, the illumination mode toggle switch, and the circuit board correspondingly.

6. The direct-lighting mode and soft-lighting mode interchangeable photography LED illuminating lamp according to claim 2, wherein the lamp casing is provided with a circuit board therein and the first LED lights and the second LED lights are electrically connected to the power supply connector, the power supply switch, the illumination mode toggle switch, and the circuit board correspondingly.

7. The direct-lighting mode and soft-lighting mode interchangeable photography LED illuminating lamp according to claim 1, wherein the luminescence window is provided on a detachable window frame on the lamp casing.

8. The direct-lighting mode and soft-lighting mode interchangeable photography LED illuminating lamp according to claim 2, wherein the luminescence window is provided on a detachable window frame on the lamp casing.

9. The direct-lighting mode and soft-lighting mode interchangeable photography LED illuminating lamp according to claim 1, wherein the lamp casing is provided with an illumination brightness regulator and an illumination color temperature regulator, and the first LED lights and the second LED lights are electrically connected to the power supply connector, the power supply switch, the illumination mode toggle switch, the illumination brightness regulator, the illumination color temperature regulator and the circuit board correspondingly.

10. The direct-lighting mode and soft-lighting mode interchangeable photography LED illuminating lamp according to claim 2, wherein the lamp casing is provided with an illumination brightness regulator and an illumination color temperature regulator, and the first LED lights and the second LED lights are electrically connected to the power supply connector, the power supply switch, the illumination mode toggle switch, the illumination brightness regulator, the illumination color temperature regulator and the circuit board correspondingly.

* * * * *